(12) United States Patent
Pirinen et al.

(10) Patent No.: US 10,742,970 B2
(45) Date of Patent: Aug. 11, 2020

(54) DEVICE AND METHOD FOR MEASURING SPATIAL COLOR AND RESOLUTION

(71) Applicant: AAC Technologies Pte. Ltd., Singapore (SG)

(72) Inventors: Ossi Pirinen, Shenzhen (CN); Tuomas Punta, Shenzhen (CN); Ville Nummela, Shenzhen (CN); Xingbo Wang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/198,304

(22) Filed: Nov. 21, 2018

(65) Prior Publication Data
US 2020/0059641 A1 Feb. 20, 2020

(30) Foreign Application Priority Data
Aug. 15, 2018 (CN) .......................... 2018 1 0926216

(51) Int. Cl.
*H04N 17/02* (2006.01)
*G06T 7/80* (2017.01)
*G06T 7/90* (2017.01)
*G01J 3/50* (2006.01)

(52) U.S. Cl.
CPC .............. *H04N 17/02* (2013.01); *G01J 3/501* (2013.01); *G06T 7/80* (2017.01); *G06T 7/90* (2017.01)

(58) Field of Classification Search
CPC ................................ G06T 7/80; H04N 1/6033
See application file for complete search history.

(56) References Cited

U.S. PATENT DOCUMENTS

| | | | | |
|---|---|---|---|---|
| 8,634,014 B2* | 1/2014 | Kohler | ................... | H04N 1/401 348/222.1 |
| 2004/0239798 A1* | 12/2004 | Nayar | .................... | H04N 5/235 348/362 |
| 2005/0036032 A1* | 2/2005 | Lee | ....................... | H04N 17/002 348/188 |

(Continued)

FOREIGN PATENT DOCUMENTS

CN          1246253 A1        3/2000

OTHER PUBLICATIONS

1st Office Action dated Nov. 4, 2019 by SIPO in related Chinese Patent Application No. 201810926216.9(12 Pages).

*Primary Examiner* — Paulos M Natnael
(74) *Attorney, Agent, or Firm* — IPro, PLLC; Na Xu

(57) ABSTRACT

A device and a method for measuring spatial color characteristic and resolution are provided. The measuring device includes: a light source, a measuring dial plate and a camera under test, wherein the light source has at least two different spectral power distribution characteristics, the measuring dial plate is provided with a through hole penetrating a thickness direction of the measuring dial plate, the light emitted from the light source passes through the through hole, and the surface of the measuring dial plate is set in black color; the measuring dial plate can also be provided with a measuring pattern, the light emitted from the light source passes through a region other than the measuring pattern. With the device provided in the present disclosure, the spatial color and resolution of the camera can be measured simultaneously, which shortens the manufacture cycle of the camera and reduces measurement cost.

13 Claims, 5 Drawing Sheets

(56) References Cited

U.S. PATENT DOCUMENTS

| | | | |
|---|---|---|---|
| 2005/0219363 A1* | 10/2005 | Kohler | H04N 1/401 348/187 |
| 2010/0201894 A1* | 8/2010 | Nakayama | G09G 3/3433 348/745 |
| 2012/0242501 A1* | 9/2012 | Tran | A61B 5/0024 340/870.02 |
| 2013/0046175 A1* | 2/2013 | Sumi | A61B 8/08 600/431 |
| 2014/0293091 A1* | 10/2014 | Rhoads | G01J 3/513 348/234 |
| 2015/0204657 A1* | 7/2015 | Fujita | G01B 11/2513 348/135 |
| 2017/0048518 A1* | 2/2017 | Jiang | G03B 43/00 |
| 2019/0287495 A1* | 9/2019 | Mathur | G09G 5/391 |

* cited by examiner

DEVICE AND METHOD FOR MEASURING SPATIAL COLOR AND RESOLUTION

CROSS-REFERENCE TO RELATED APPLICATIONS

The present application claims priority to Chinese Patent Application No. 201810926216.9, filed on Aug. 15, 2018, the content of which is incorporated herein by reference in its entirety.

TECHNICAL FIELD

The present disclosure relates to the field of optical imaging technologies, and in particular, to a device and a method for measuring spatial color characteristic and resolution.

BACKGROUND

In a process for producing a camera, measuring and calibrating spatial color characteristic and resolution of the manufactured camera are necessary steps to be performed. At present, measuring spatial color characteristic and resolution is performed by different devices, which results in a long production cycle of the camera, and the process for testing the camera may waste manpower and material resources.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The disclosure will be further described in detail below with reference to the embodiments and drawings.

First Embodiment

Figure 1:
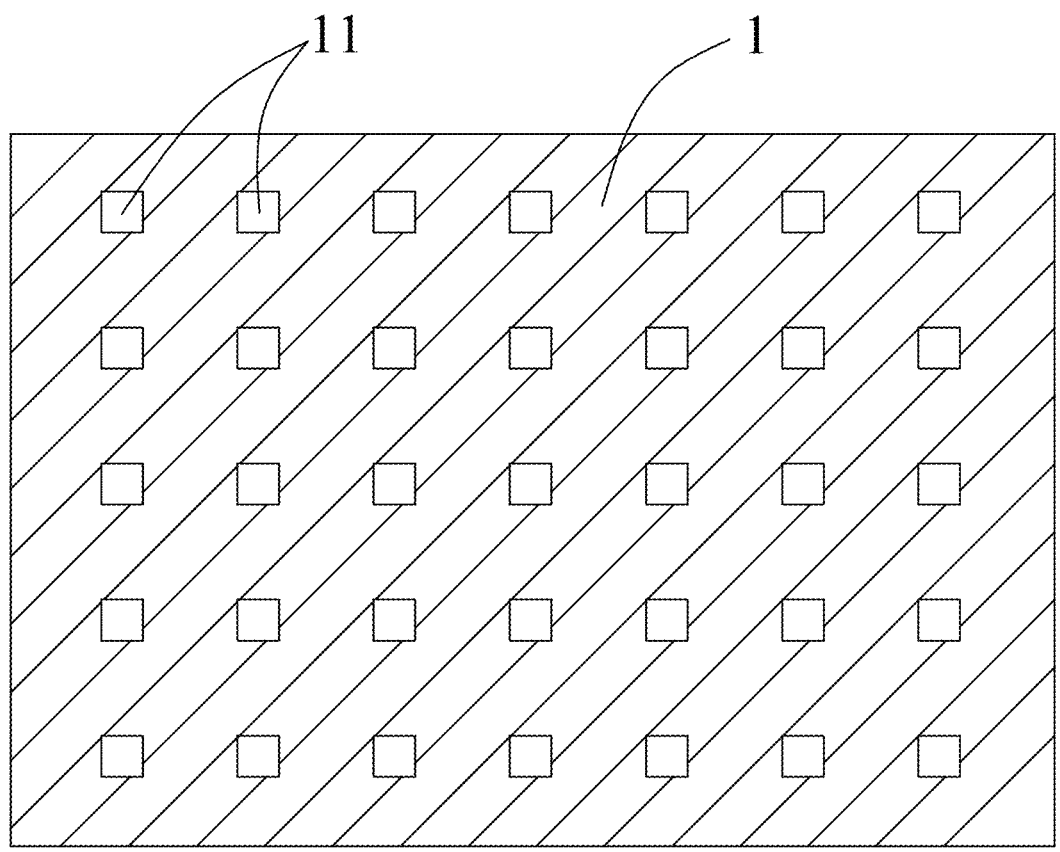
FIG. 1 is a structural schematic diagram of a square hole measuring dial plate according to a first embodiment of the present disclosure.
Figure 2:
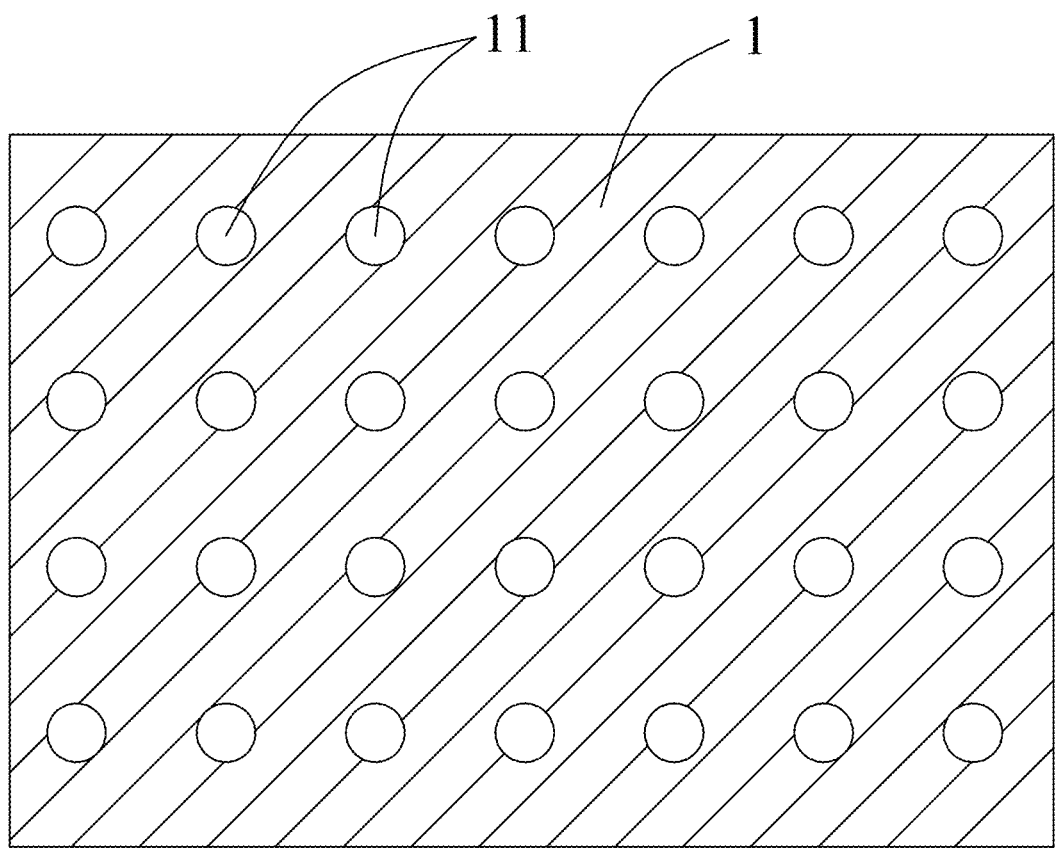
FIG. 2 is a structural schematic diagram of a circular hole measuring dial plate according to the first embodiment of the present disclosure.

Embodiments of the present disclosure provide a device for measuring spatial color characteristic and resolution so as to measure the resolution and the spatial color characteristic for a mass-produced camera. The device includes a measuring dial plate 1 which is a plate-like structure having a certain thickness with its surface color set as black. As shown in FIGS. 1 and 2, the measuring dial plate 1 is provided with a plurality of through holes 11 penetrating in a thickness direction thereof. A light source having at least two different spectral power distribution characteristics is placed at one side of the measuring dial plate 1, and a camera under test is placed at the other side of the measuring dial plate 1. In a process of measuring the spatial color characteristic and resolution for the camera under test, the light emitted from the light source passes through the through holes 11, and the measuring camera photograph the measuring dial plate to obtain a measured image. The resolution of the camera under test is obtained by means of a marginal diffusion function of the measured image, contrast measurement of stripe or sinusoidal black and white patterns or spatial frequency response of white noise (pseudo noise), etc. At the same time, an image and light source are compared and tested by a software to obtain the spatial color characteristic of the camera under test. The light source is switched to possess different spectral color characteristics for measurement, at least one measured image is obtained under irradiation of the respective light sources, and the spatial response of the camera under test for the different spectral distribution characteristics can be obtained by calculation. Preferably, the measuring dial plate 1 having the through-holes 11 can be formed by one-piece molding, which can improve the structural consistency of the measuring dial plate 1 and simplify the manufacturing process of the measuring dial plate 1. Further, the light source and the camera under test can be placed on the same side of the measuring dial plate, or on different sides of the measuring dial plate.

With the device for measuring spatial color characteristic and resolution provided by the present disclosure, the measuring dial plate is photographed by the camera under test to obtain a captured image after the light emitted from the light source irradiates through the measuring dial plate, and resolution of the camera under test can be obtained by calculation. Meanwhile, by comparing the captured image with the light source, the spatial color characteristic of the camera under test can be obtained. Therefore, with the measuring device provided by the present disclosure, the spatial color characteristic and resolution of the camera can be simultaneously measured, which can shorten the manufacture cycle of the mass-produced camera and reduce the measurement cost.

The LED has wide applicability, good stability and different spectral distribution characteristics, which is beneficial to the measurement of the spatial color characteristic of the camera under test. Therefore, preferably, the light source can be an LED, an LED array, or a tunable laser diode array having different spectral distribution characteristics. Further, the light source emits an optical wave having a uniform intensity, thereby improving the measurement accuracy.

Further, the measuring dial plate 1 can be provided with a plurality of through holes 11. As shown in FIGS. 1 and 2, the through holes 11 can be round or square, and the structures of the plurality of through holes 11 are the same and are arranged in a determinant matrix. In the case where the plurality of through holes 11 on the measuring dial plate 1 are arranged in a determinant matrix, the distance between two adjacent through holes 11 in each row is set to be equal to the distance between two adjacent through holes 11 in each column, so that the distances between two adjacent through holes 11 in another direction inclined with respect to the row direction and the column direction are also equal. Meanwhile, the manufacturing process of the measuring dial plate 1 with such a structure is relatively simple. In addition, the structure of the measuring dial plate 1 is relatively reliable, and each part thereof is not easily deformed by an external force during the measurement process, thereby avoiding adverse influence to the measurement result.

Further, the row distance and the column distance between the circular through holes 11 are both larger than the diameter of the through holes 11. The row distance and the column distance between the square through holes 11 are both larger than the maximum edge length of the through holes 11.

It can be seen from the above that the present disclosure provides a measuring device. With the measuring device, the measurement of the resolution and the spatial color characteristic of the camera under test can be simultaneously realized, thereby saving cost and feedback time of the measurement result, thereby being easier for mass-production.

Figure 5:
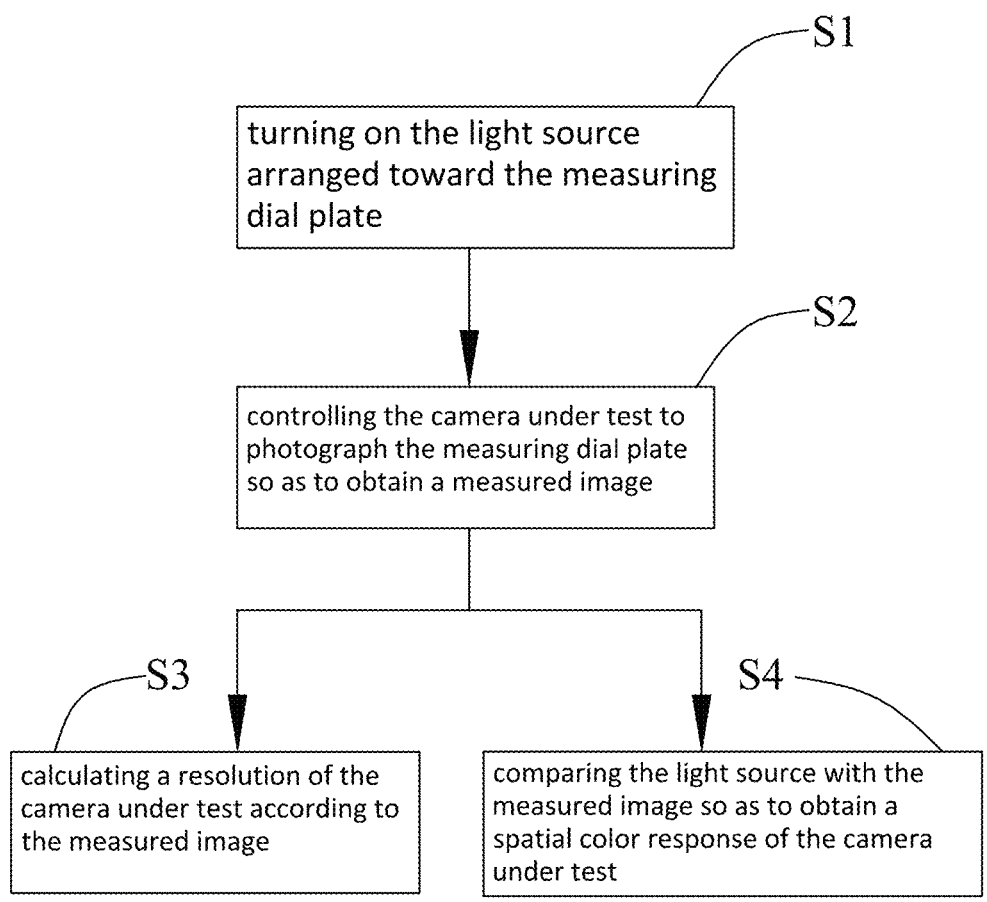
FIG. 5 is a flowchart of a method for measuring spatial color and resolution according to an embodiment of the present disclosure.

Based on the device for measuring a spatial color characteristic and a resolution provided by any one of the above embodiments, the present disclosure further provides a method for measuring spatial color and resolution, as shown in FIG. 5, the measuring method includes the following.

At S1, the light source arranged toward the measuring dial plate 1 is turned on. The light source can be an LED, an LED array, or a tunable laser diode array having different spectral power distribution characteristics. The measuring dial plate 1 has a plate-like structure having a through hole 11, the light source is arranged at one side of the measuring dial plate 1 and is arranged towards the measuring dial plate. When the spatial color characteristic and the resolution of the camera under test are required to be measured, the light source is turned on so that the light emitted from the light source passes through the through hole 11 of the measuring dial plate 1.

At S2, the camera under test is controlled to photograph the measuring dial plate so as to obtain a measured image. During the photographing process of the camera under test, the measuring dial plate 1 is photographed, either manually controlled or automatically controlled, by the camera under test, the light sources having different spectral power distribution characteristics are switched, and at least one measured image can be obtained for each light source.

At S3, resolution of the camera under test is calculated according to the measured image. The resolution of the camera under test is obtained by means of a marginal diffusion function of the measured image, contrast measurement of stripe or sinusoidal black and white patterns or spatial frequency response of white noise (pseudo noise).

At S4, the light source having different spectral power distribution characteristics are each compared with the measured image so as to obtain a spatial color characteristic of the camera under test. By comparing the light source with the aforementioned measured image and combining a set algorithm, the spatial color characteristic of the camera under test can be obtained.

Figure 3:
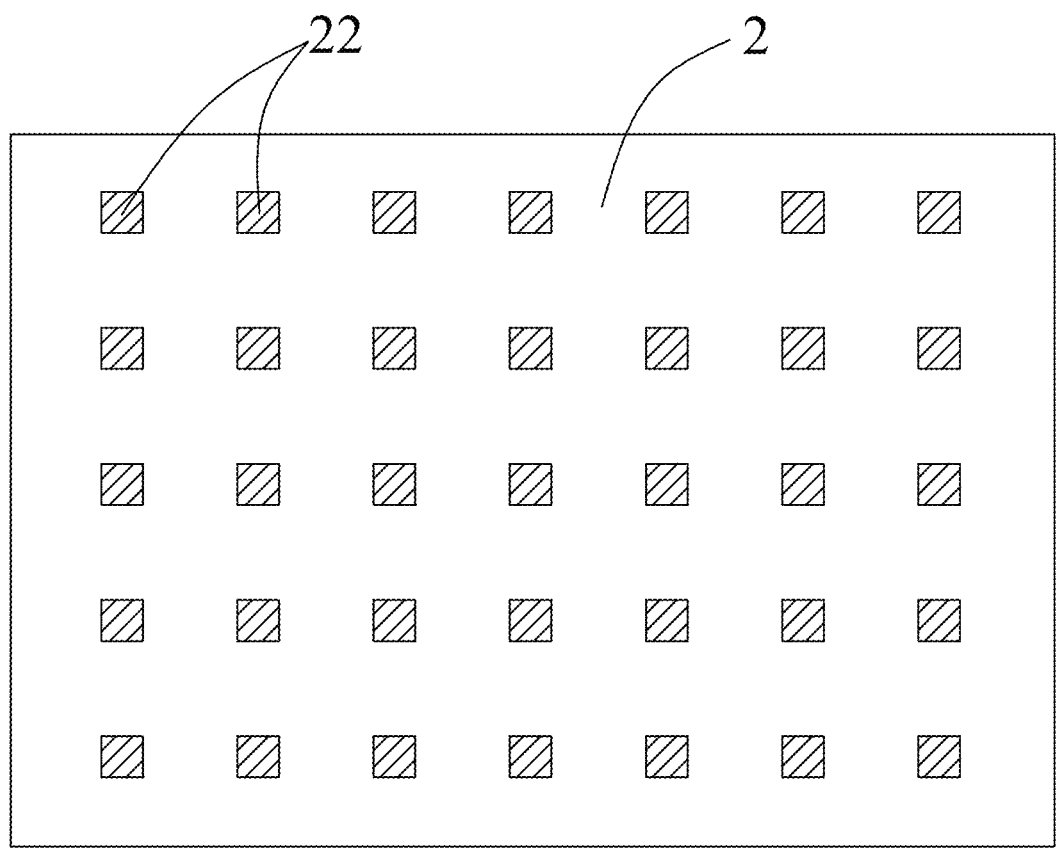
FIG. 3 is a structural schematic diagram of a square pattern measuring dial plate according to a second embodiment of the present disclosure.
Figure 4:
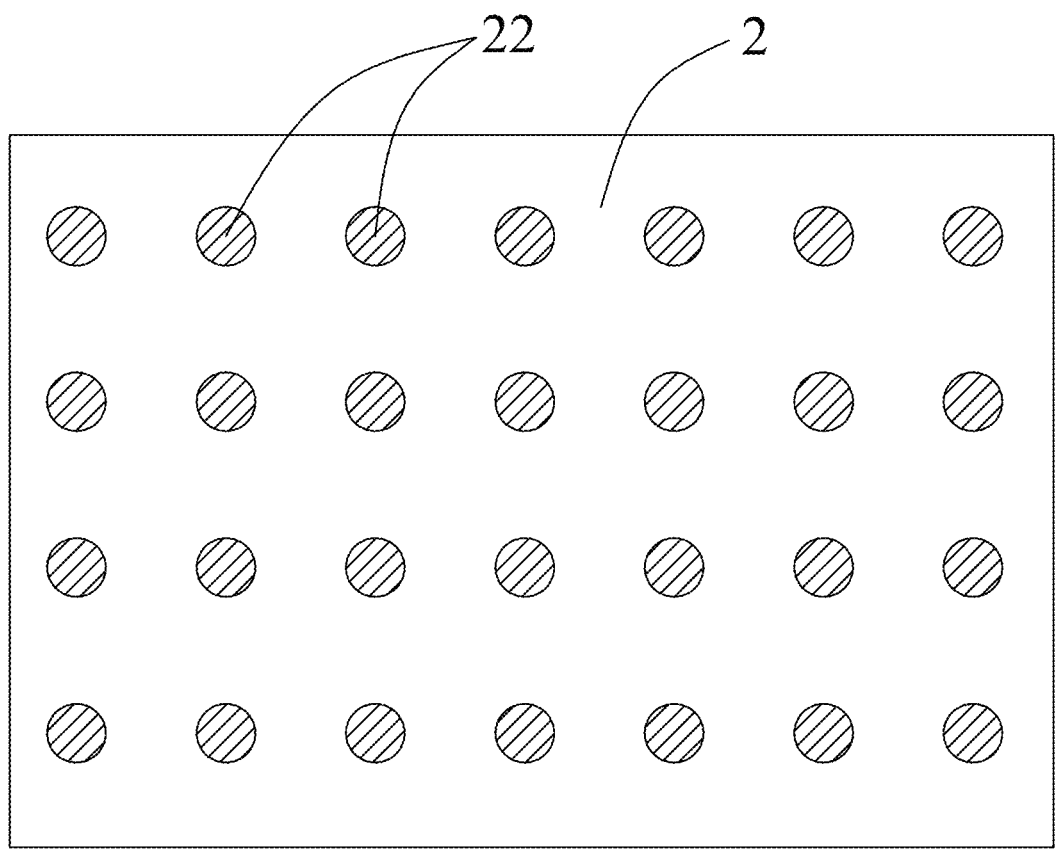
FIG. 4 is a structural schematic diagram of a circular pattern measuring dial plate according to the second embodiment of the present disclosure.

This embodiment (Second Embodiment) is basically the same as the first embodiment, and thus only the differences are listed below. In the first embodiment, the measuring dial plate 1 is provided with a through hole 11, and in this embodiment, the measuring dial plate 2 is a transparent printing plate on which a measuring pattern 22 is provided. As shown in FIGS. 3 and 4, the measuring dial plate 2 is a thin measuring card, and the measuring pattern 22 is opaque. Specifically, the test pattern 22 can be set to be black, white or other colors. In particular, the measuring pattern may be set to a square, a circle or other shapes. The light emitted from the light source passes through a region other than the measuring pattern 22.

The above-described embodiments are merely preferred embodiments of the present disclosure and are not intended to limit the present disclosure. Various modifications and changes can be made by those skilled in the art. However, any modifications, equivalent substitutions and improvements made within the principle of the present disclosure shall fall into the protection scope of the present disclosure.

What is claimed is:

1. A device for measuring spatial color characteristic and resolution, comprising: a light source, a measuring dial plate and a camera under test, wherein the light source has at least two different spectral power distribution characteristics, the measuring dial plate is provided with a through hole penetrating a thickness direction of the measuring dial plate, light emitted from the light source passes through the through hole, and a surface of the measuring dial plate is set in black color; and the resolution of the camera is obtained by means of a marginal diffusion function of an image of the measuring dial plate captured by the camera, contrast measurement of stripe or sinusoidal black and white patterns or spatial frequency response of white noise; wherein, the light source and the camera under test are placed on a same side of the measuring dial plate, wherein the through hole is a circular hole or a square hole, wherein a plurality of through holes is provided, and the plurality of through holes has a same structure and are arranged in a determinant array, wherein each of the plurality of through holes is a circular hole, and a row distance and a column distance between the through holes are larger than a diameter of the through hole.

2. The device according to claim 1, wherein the light source is a light-emitting diode (LED), an LED array, or a tunable laser diode array having different spectral power distribution characteristics, and the light source is configured to emit an optical wave having a uniform intensity.

3. The device according to claim 2, wherein a row distance between the through holes is equal to a column distance between the through holes.

4. The device according to claim 3, wherein each of the plurality of through holes is a square hole, and a row distance and a column distance between the through holes are larger than a maximum edge length of the through hole.

5. A method for measuring spatial color and resolution using the device according to claim 1, comprising:

turning on the light source arranged toward the measuring dial plate;

controlling the camera under test to photograph the measuring dial plate so as to obtain a measured image;

calculating a resolution of the camera under test according to the measured image, wherein the resolution of the camera is obtained by means of a marginal diffusion function of the measured image, contrast measurement of stripe or sinusoidal black and white patterns or spatial frequency response of white noise; and comparing the light source with the measured image so as to obtain a spatial color characteristic of the camera under test, wherein the through hole is a circular hole or a square hole, wherein a plurality of through holes is provided, and the plurality of through holes has a same structure and are arranged in a determinant array, wherein each of the plurality of through holes is a circular hole, and a row distance and a column distance between the through holes are larger than a diameter of the through hole.

6. A device for measuring spatial color characteristic and resolution, comprising: a light source, a measuring dial plate and a camera under test, wherein the light source has at least two different spectral power distribution characteristics, the measuring dial plate is provided with a measuring pattern, and light emitted from the light source passes through a region other than the measuring pattern; the measuring dial plate is a transparent printing plate, while the measuring pattern is opaque; and the resolution of the camera is obtained by means of a marginal diffusion function of an image of the measuring dial plate captured by the camera, contrast measurement of stripe or sinusoidal black and white patterns or spatial frequency response of white noise; wherein, the light source and the camera under test are placed on a same side of the measuring dial plate, wherein the through hole is a circular hole or a square hole, wherein a plurality of through holes is provided, and the plurality of through holes has a same structure and are arranged in a determinant array, wherein each of the plurality of through holes is a circular hole, and a row distance and a column distance between the through holes are larger than a diameter of the through hole.

7. The device according to claim 6, wherein the light source is a light-emitting diode (LED), an LED array, or a tunable laser diode array having different spectral power distribution characteristics, and the light source is configured to emit an optical wave having a uniform intensity.

8. The device according to claim 6, wherein the measuring pattern is a circular pattern or a square pattern.

9. The device according to claim 8, wherein a plurality of measuring patterns is provided, and the plurality of measuring patterns has a same structure and is arranged in a determinant array.

10. The device according to claim 9, wherein a row distance between the measuring patterns is equal to a column distance between the measuring patterns.

11. The device according to claim 9, wherein each of the measuring patterns is a circular pattern, and a row distance and a column distance between the measuring patterns are larger than a diameter of the measuring pattern.

12. The device according to claim 9, wherein each of the measuring patterns is a square pattern, and a row distance and a column distance between the measuring patterns are larger than a maximum edge length of the measuring pattern.

13. A method for measuring spatial color and resolution applied to the device according to claim 6, comprising:

turning on the light source arranged toward the measuring dial plate;

controlling the camera under test to photograph the measuring dial plate so as to obtain a measured image;

calculating a resolution of the camera under test according to the measured image, wherein the resolution of the camera is obtained by means of a marginal diffusion function of measured image, contrast measurement of stripe or sinusoidal black and white patterns or spatial frequency response of white noise; and comparing the light source with the measured image so as to obtain a spatial color characteristic of the camera under test, wherein the through hole is a circular hole or a square hole, wherein a plurality of through holes is provided, and the plurality of through holes has a same structure and are arranged in a determinant array, wherein each of the plurality of through holes is a circular hole, and a row distance and a column distance between the through holes are larger than a diameter of the through hole.

* * * * *